US005564654A

United States Patent [19]
Nordstrom

[11] Patent Number: 5,564,654
[45] Date of Patent: Oct. 15, 1996

[54] AIRCRAFT CARGO RESTRAINT APPARATUS

[76] Inventor: Arnold Nordstrom, P.O. Box 390655, Anza, Calif. 92539

[21] Appl. No.: 322,706

[22] Filed: Oct. 13, 1994

[51] Int. Cl.$^6$ ........................................... B64C 1/20
[52] U.S. Cl. ........................ 244/118.1; 244/137.1; 244/137.3; 248/500; 248/346.06; 410/77; 410/80
[58] Field of Search .................. 244/137.1, 137.3, 244/118.1; 248/500, 501, 346.06; 410/104, 105, 77, 78, 79, 80, 81, 84, 54, 55, 94

[56] References Cited

U.S. PATENT DOCUMENTS

| | | | |
|---|---|---|---|
| 3,241,501 | 3/1966 | Watts | 410/105 |
| 3,800,713 | 4/1974 | Nordstrom | 105/369 |
| 3,986,460 | 10/1976 | Voigt et al. | 244/137.1 |
| 3,995,562 | 12/1976 | Nordstrom | 105/465 |
| 4,583,896 | 4/1986 | Vogg et al. | 244/118.1 |
| 5,104,064 | 4/1992 | Kuitems | 244/137.1 |
| 5,131,606 | 7/1992 | Nordstrom | 244/118.1 |
| 5,169,091 | 12/1992 | Beroth | 244/118.1 |
| 5,316,242 | 5/1994 | Eilenstein-Wiegmann et al. | 244/137.1 |
| 5,486,077 | 1/1996 | Nutting | 244/137.1 |

Primary Examiner—Andres Kashnikow
Assistant Examiner—Tien Dinh
Attorney, Agent, or Firm—J. E. Brunton

[57] ABSTRACT

A foot operated restraint apparatus for use in restraining cargo carriers such as pallets and containers within aircraft cargo bays. The apparatus includes a pair of cooperating, spring-loaded, fully retractable, carrier restraining elements which can be depressed and erected by the foot of the cargo handler.

20 Claims, 9 Drawing Sheets

AIRCRAFT CARGO RESTRAINT APPARATUS

BACKGROUND OF THE INVENTION

1. Field of the Invention

The present invention relates generally to apparatus for restraining cargo carriers such as pallets and containers within aircraft cargo bays. More particularly, the invention concerns a foot-operated restraint device comprising spring-loaded, fully retractable, carrier restraining elements operable by the foot of the user.

2. Discussion of the Invention

It is common in cargo transport vehicles, such as cargo airplanes, to provide restraint devices to hold each cargo container or unit load device (ULD) in a fixed position within the aircraft cargo bay. Historically, the prior art restraint devices have been operated by hand. Such prior art devices require that the loading personnel bend over and, using the hands, engage and disengage the carrier restraining elements each time a ULD is loaded or unloaded. Normally, a substantial number of individual restraint devices are used within the aircraft cargo bay. For example, the number of restraint devices used per aircraft typically varies from about 40 for a 727–100 F aircraft to approximately 120 for a 767 aircraft.

One example of a highly novel air cargo container restraint device is that disclosed in U.S. Pat. No. 3,800,713 issued to the present inventor. In U.S. Pat. Nos. 3,995,562 and 5,131,606, also issued to the present inventor, additional types of unique restraining systems are disclosed. A further novel cargo container restraint device is disclosed in applicant's copending U.S. application, Ser. No. 08/006,572. This latter device comprises a self-retractable guide for centering and for vertically restraining pallets of less than full width within an aircraft cargo bay. These patents and applicant's copending application, along with the prior art patents cited during the prosecution of the application and during the prosecution of the applications which materialized into the patents, serve to clearly illustrate the novelty of the foot operated restraint device of the present invention.

Of substantial importance to a full appreciation of the significance of the present invention is the fact that because of increased fleet sizes and increased frequency of flight schedules, there has been a substantial increase in both back injuries suffered by cargo handlers and the related workers compensation payments paid by their employers. Use of the foot operated apparatus of the present invention, which eliminates the need for bending during the operation of the restraint devices, substantially decreases the occurrence of those worker back injuries that are related to bending thereby making the invention highly attractive to the aircraft industry.

SUMMARY OF THE INVENTION

The foot actuated restraint apparatus of the present invention is uniquely affixed to the floor tracks of the cargo aircraft cargo bay using connectors of special design. The apparatus in its preferred form comprises a frame, a pair of cooperating, fully retractable carrier-restraining elements, and the necessary springs, latch devices, and stops necessary to achieve the desired operational functions. The function of the apparatus is unique in that a first carrier-restraining element rotates about a first axis parallel to the longitudinal center line of the aircraft, while the other rotates about a second axis which is generally perpendicular to the first axis. When erected, the first element partially overlaps the second so that in combination they will carry substantial fore, aft, and vertical forces generated by flight loads.

In practice, when the apparatus in its extended carrier-restraint configuration, the cargo handler can step on and thereby depress the first carrier-restraining element in a manner such that it will automatically lock into the retracted position. The cargo handler can next step on the second, cooperating restraint element causing it to rotate downwardly into its full down and latched position. With the elements thus down and locked, the cargo carriers can freely pass over the restraint device without interference.

To move the restraint elements of the device from their retracted, or depressed configuration into its extended configuration, the cargo handler merely has to step on the treadle plate of the device and both of the carrier-restraining elements will automatically rotate upwardly into their upraised and interlocked positions.

With the foregoing in mind, it is an object of the present invention to provide an aircraft cargo carrier restraint device of novel construction which can be operated solely by one foot of the cargo handler thereby eliminating the need for the cargo handler to repeatedly bend over to operate each of the very large number of restraint devices which are commonly used to restrain the cargo carried in large aircraft.

Another object of the invention is to provide a restraint device of the aforementioned character which embodies track connectors of unique design that enable the device to be secured to the cargo bay tracks in a manner such that they will sustain high vertical loads with lower component stresses.

Another object of the invention is to provide a restraint device of the character described in the preceding paragraphs which is easy to use, is semi-automatic in operation having only five moving parts and one which requires minimum maintenance.

Another object of the invention is to provide a restraint device of the class described which is lightweight, compact, reliable in use and relatively simple to manufacture.

DESCRIPTION OF THE INVENTION

Figures 1, 2:
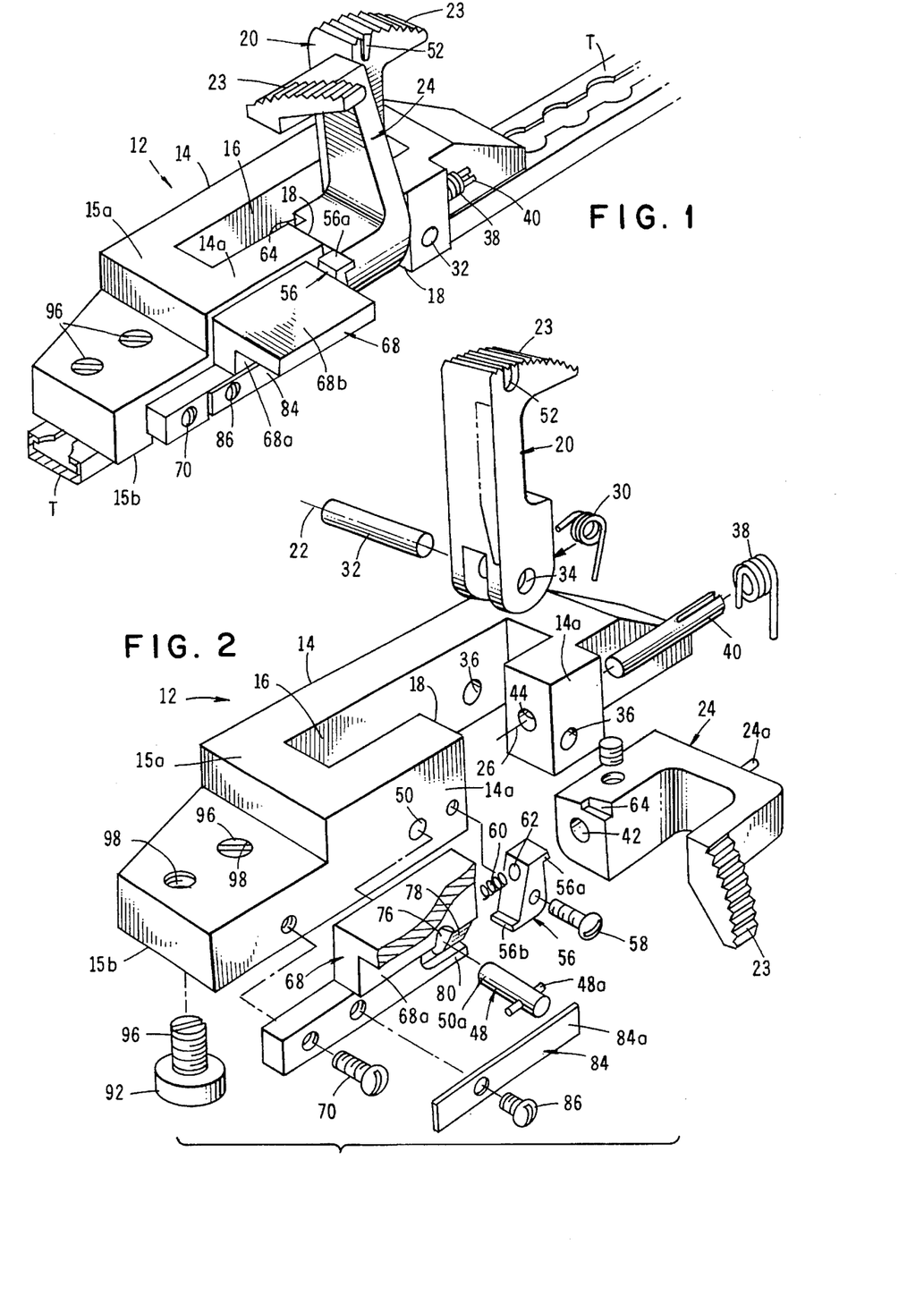
FIG. 1 is a generally perspective view of one form of the cargo carrier restraint apparatus of the present invention.
FIG. 2 is a generally perspective, exploded view of the apparatus of FIG. 1.

Referring to the drawings and particularly to FIGS. 1 and 2, one form of the foot-operated cargo carrier restraint device of the present invention is there illustrated. The restraint device is used in restraining air cargo containers that are disposed within an aircraft cargo hold of the type having a floor provided with a plurality of longitudinally extending, spaced-apart tracks. In the form of the invention shown in FIGS. 1 and 2, the restraint device comprises a frame 12 having spaced-apart side portions 14 and 14a and spaced-apart top and bottom surfaces 15a and 15b respectively. Side portions 14 and 14a cooperate to define a central opening 16 while side portion 14a is interrupted to define a side opening 18. Side opening 18 communicates with central opening 16 in the manner best seen in FIG. 2.

Figures 7, 9, 10:
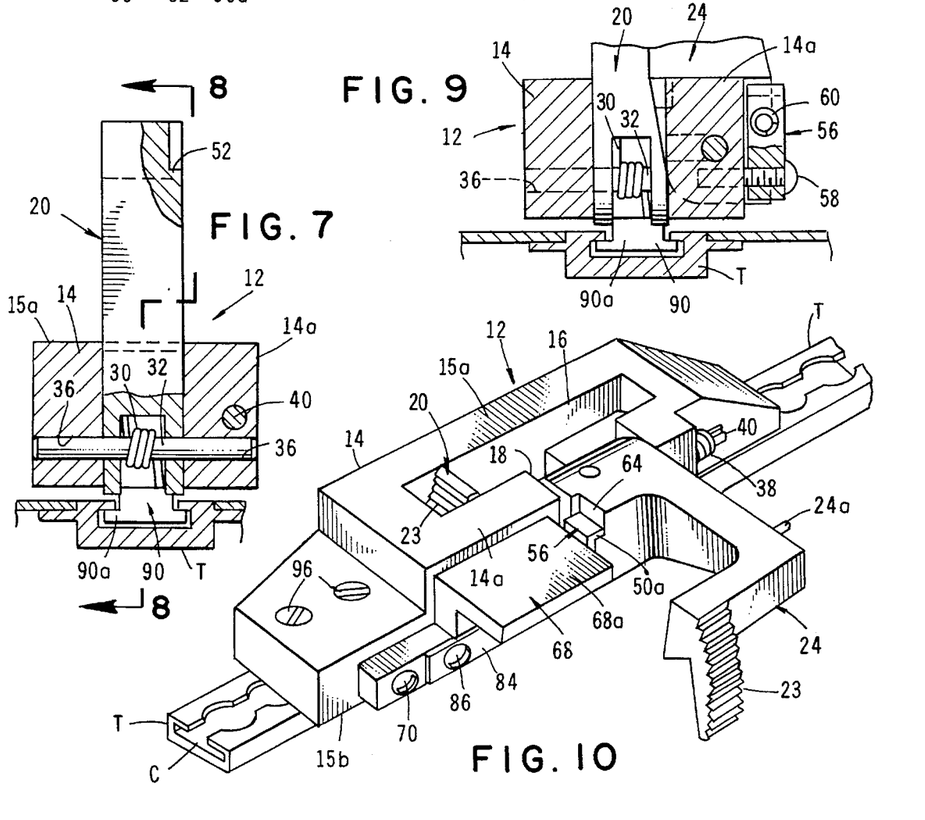
FIG. 7 is a cross-sectional view taken along lines 7—7 of FIG. 3.
FIG. 9 is a cross-sectional view taken along lines 9—9 of FIG. 3.
FIG. 10 is a generally perspective view of the apparatus similar to FIG. 1 but showing the carrier-restraining elements of the apparatus in a downward, retracted position.

Pivotally connected to frame 12 for pivotal movement within central opening 16 is a first, generally U-shaped restraint element 20. Restraint element 20 pivots about a first axis 22 (FIG. 2) between a first or upstanding position shown in FIG. 1 and a lowered or retracted position shown in FIG. 10. Similarly, a second generally U-shaped restraint element 24 is pivotally connected to frame 14 for pivotal movement within side opening 18 about a second axis 26 between a first upstanding position as shown in FIG. 1 and a second retracted or lowered position as shown in FIG. 10. As best seen by referring to FIG. 2, second axis 26 extends generally perpendicular to axis 22 about which first restraint element 20 pivots.

Figures 3, 4, 5:
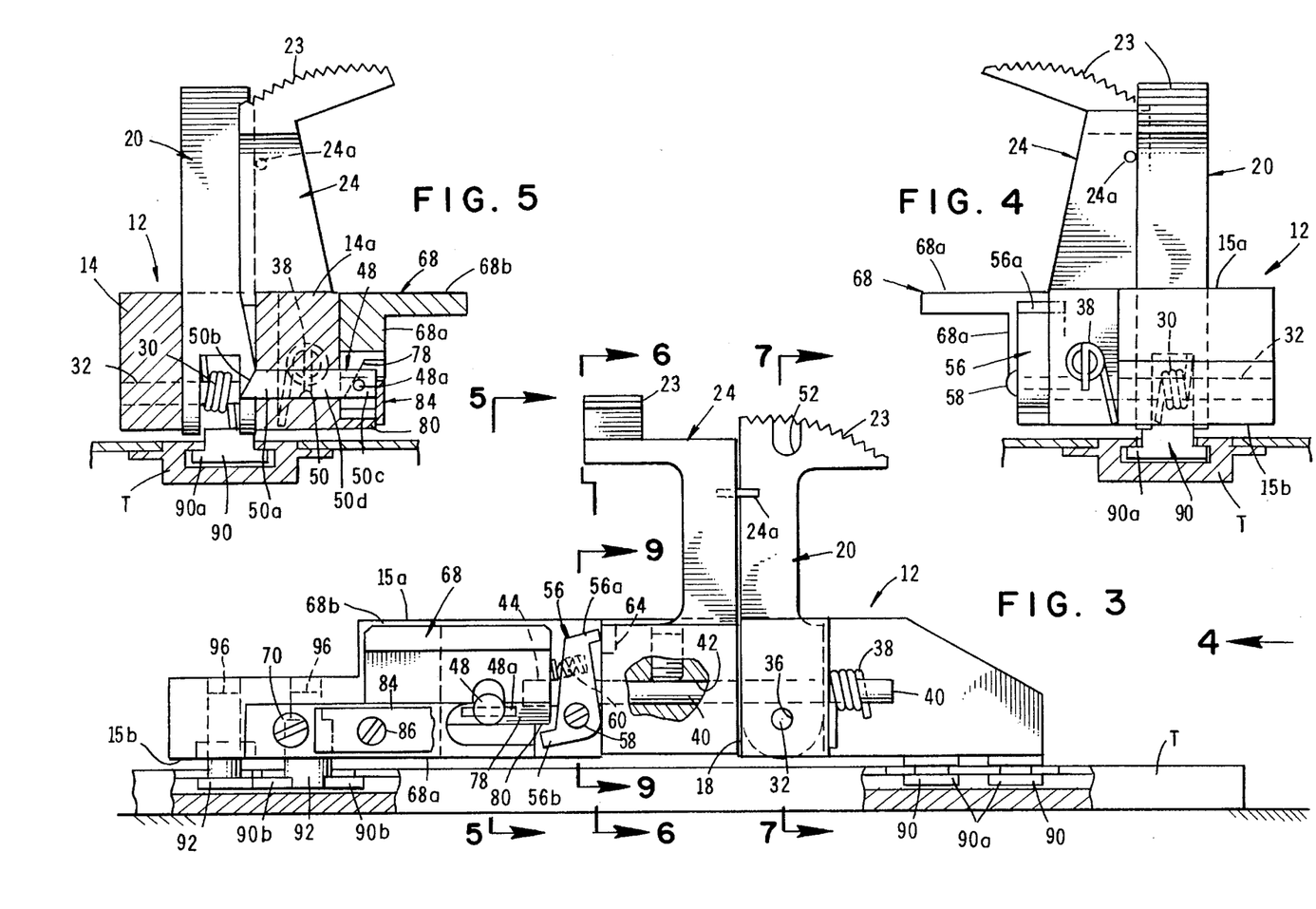
FIG. 3 is a side-elevational view of the apparatus of FIG. 1 partly broken away to show internal construction.
FIG. 4 is a partly cross-sectional end view taken in the direction line 4 of FIG. 3.
FIG. 5 is a cross-sectional view taken along lines 5—5 of FIG. 3.
Figure 6:
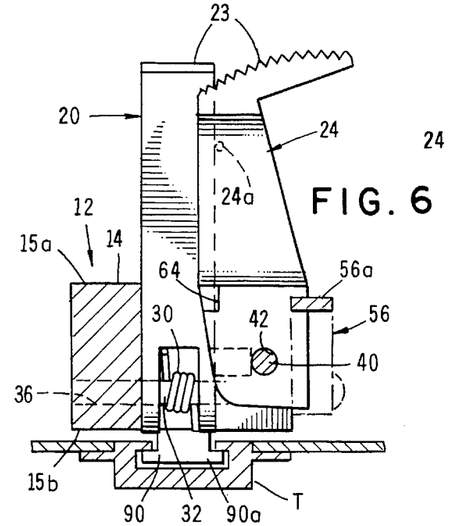
FIG. 6 a cross-sectional view taken along lines 6—6 of FIG. 3.

A first biasing means, shown here as a torsion spring 30, yieldably resists movement of first restraining element 20 in a direction toward the second or lowered position shown in FIG. 10. Torsion spring 30 surrounds a pivot shaft 32 which is receivable within a bore 34 provided in restraint element 20 and within aligned bores 36 provided in the side portions of frame 12. In a similar manner, a second biasing means, shown here as a second torsion spring 38, yieldably resists movement of second restraint element 24 in a direction toward the second or retracted position shown in FIG. 10. Torsion spring 38 surrounds a pivot shaft 40 which is receivable within a bore 42 provided in second restraint element 24 and within aligned bores 44 provided in portion 14a of frame 12 (FIG. 2 and FIG. 3).

To releasably lock first restraint element 20 in its second or lowered position, first locking means are provided. As best seen by referring to FIGS. 5, 14 and 15, this first locking means comprises a locking pin 48 which is telescopically movable relative to side portion 14a within a bore 50 provided in side portion 14a. Locking pin 48 has a first end 50a provided with a tapered wall portion 50b, a second end 50c, and an intermediate portion 50d. When restraint element 20 is in its retracted position, first end 50a of the pin is receivable within a generally U-shaped recess 52 provided in the inboard wall of restraint element 20. When pin 48 is in the first locking position, shown in FIG. 14, restraint element 20 will be locked in its retracted position and will be prevented from returning toward its upstanding position due to the urging of torsion spring 30. In the manner presently to be described, locking pin 48 can be moved into a second position shown in FIG. 15 wherein end 50a clears recess 52 so as to permit the torsion spring to rapidly urge restraint element 20 into its upstanding position.

To releasably lock second restraint element 24 in its retracted or lowered position, second locking means is provided. The second locking means here comprises a latch element 56 which is pivotally connected to frame 12 by means of a latch element pivot connector 58. In a manner presently to be described, latch element 56 is pivotally movable between a first locking position shown in FIGS. 10 and 17 and a retracted or released position shown in FIG. 18. As best seen by referring to FIGS. 2, 17, and 18, latch element 56 includes a first end 56a, which is engagable with restraint element 24 when the element is in its retracted position, and a second end 56b which is engagable by the release means of the invention, the character of which will also presently be described.

Figure 17:
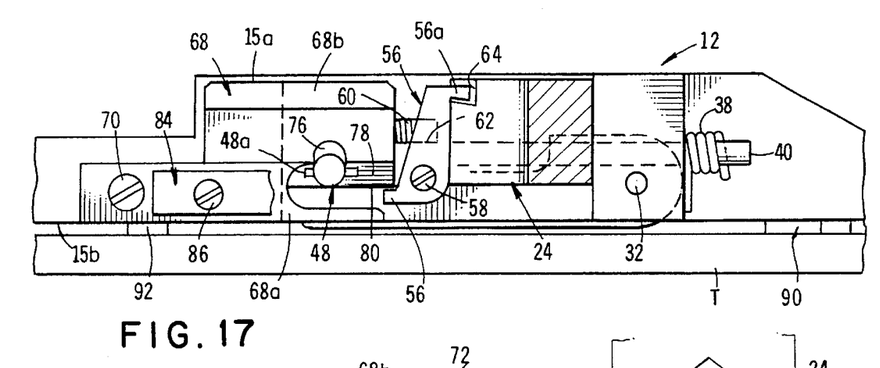
FIG. 17 is a cross-sectional view taken along lines 17—17 of FIG. 16.
Figure 18:
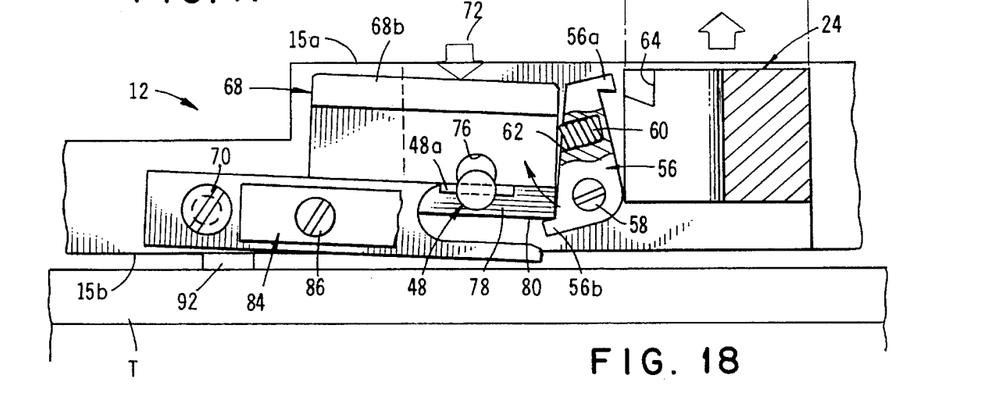
FIG. 18 is a fragmentary, side-elevational view partly in section similar to FIG. 17, but showing the treadle of the apparatus in a downwardly pivoted configuration so as to move the latching elements into a retracted position.
Figure 19:
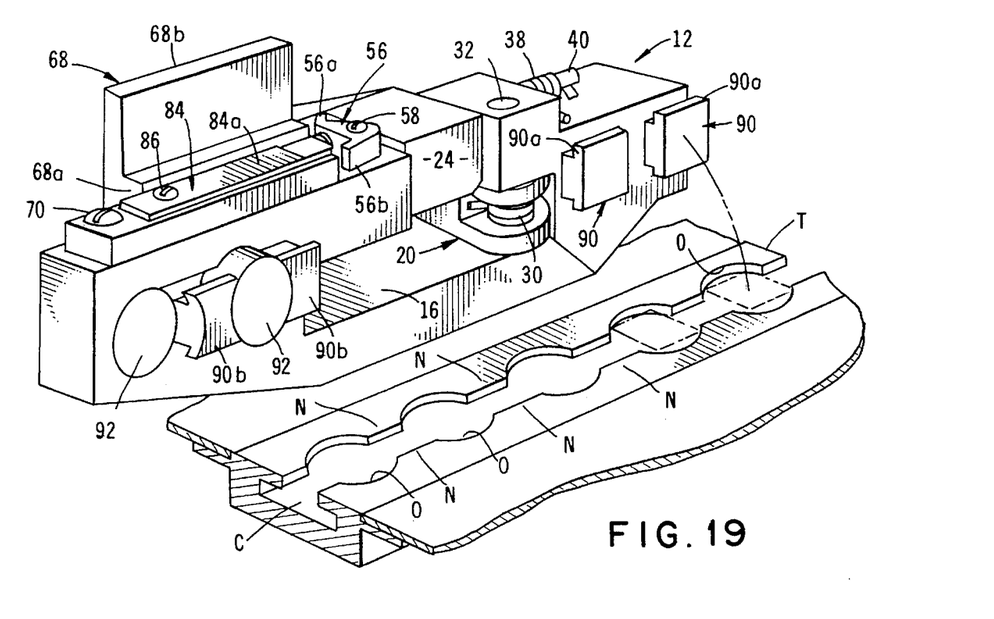
FIG. 19 is a generally perspective, exploded view illustrating the manner of attachment of the restraining device to the tracks of the aircraft cargo bay.

To yieldably resist movement of latch element 56 from the first locking position shown in FIG. 17 to the second release position shown in FIG. 18, a latching element biasing means is provided. This latch element biasing means is here shown as a coiled spring 60 which is receivable within a bore 62 provided in latch element 56. To lockably receive end 56a of the latch element, restraint element 24 is provided with a notched-out portion 64 (FIG. 2).

Forming a highly novel aspect of the apparatus of the present invention is the release means for automatically releasing the first and second locking means so as to permit the first and second restraint elements 20 and 24 to automatically move from a retracted position shown in FIG. 10 into the cargo carrier restraint, or upstanding position, as shown in FIG. 1.

As best seen by once again referring to FIGS. 2, 17, and 18, the release means of the form of the invention there shown comprises a treadle member 68 which is pivotally connected to frame 12 by means of a treadle pivot connector 70. Connector 70 permits pivotal movement of the treadle member between a first position shown in FIG. 17 and a second position shown in FIG. 18. The treadle member has a body portion 68a and a foot engaging portion 68b for engagement by the foot of the cargo handler. More particularly, when pressure is exerted against foot engaging portion 68b by the cargo handler in the direction of the arrow 72 in FIG. 18, the treadle member will pivot about pivot connector member 70 from its normal position shown in FIG. 17 to the latch release position shown in FIG. 18.

Figures 14, 15:
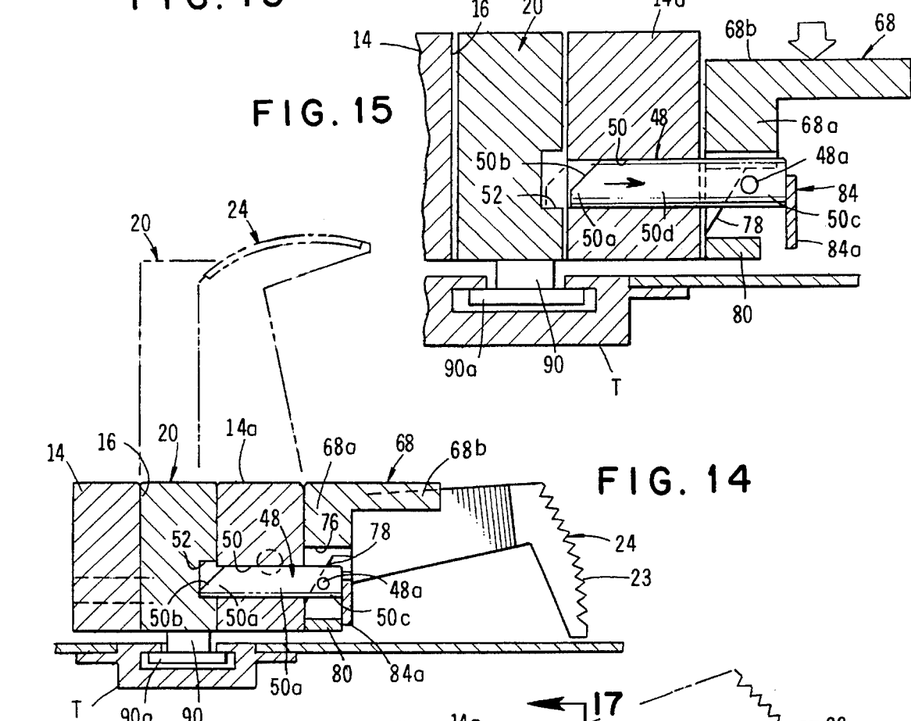
FIG. 14 is a cross-sectional view taken along lines 14—14 of FIG. 12.
FIG. 15 is a fragmentary, enlarged cross-sectional view similar to FIG. 14, but showing the operating treadle of the device in a downwardly pivoted position.
Figure 16:
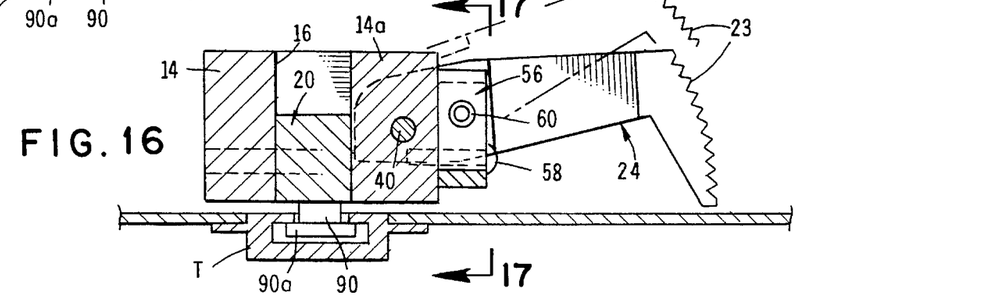
FIG. 16 is a cross-sectional view taken along lines 16—16 of FIG. 12.

Body portion 68a is provided with an aperture 76 (FIG. 15) for receipt of the previously identified locking pin 48. As indicated in FIGS. 2 and 15, body portion 68a also includes a recessed portion which defines an inclined ramp or wall 78, the purpose of which will presently be described. Body portion 68a also includes a lower latch engaging surface 80 for engaging second end 56b of latch 56 upon downward pivotal movement of the treadle (see FIG. 18).

Also forming an important part of the release means of the present form of the invention is locking pin biasing means for yieldably resisting telescopic movement of locking pin 48 in a direction toward the release, or second position, shown in FIG. 15. This locking pin biasing means is here shown as a leaf spring 84 which is connected to treadle member 68 by a threaded connector 86 in a manner indicated in FIGS. 1 and 2. As best illustrated in FIG. 15, when pin 48 moves from its first locking position shown in FIG. 14 to its release position shown in FIG. 15, the outboard end 84a of leaf spring 84 will be moved outwardly relative to treadle member 68 in the manner shown in FIG. 15. The method of moving pin 48 into its released position will be discussed more fully in the paragraphs which follow wherein the operation of the apparatus is described.

Turning now to FIGS. 19 through 23, the unique track interengagement means of the apparatus of the present invention for interengaging the tracks "T" of the aircraft cargo bay is there illustrated. This interengagement means here comprises a plurality of uniquely configured locking studs 90 which are integrally formed with frame 12 in the manner shown in FIG. 19. Unlike the prior art locking studs "S" shown in FIG. 29, which are generally circular in shape, the locking studs of the present invention are generally square. More particularly, the rectangularly shaped foot portions 90a of the locking studs are dimensioned so that they are closely receivable within the standard, spaced-apart, circular-shaped openings "O" typically provided in tracks of the character affixed to the floor of the cargo bays of the cargo aircraft In addition to spaced-apart openings "O" the upper lips of typical cargo tracks "T" are provided with necked-down portions "N" which are disposed intermediate adjacent openings "O" in the manner best seen in FIG. 19. With this construction, when it is desired to attach the restraint device of the present invention to the tracks "T" foot portions 90a are inserted into openings "O" in the manner depicted in FIGS. 19, 20, and 21. By sliding the device to the right or left within a channel "C" formed in the track "T" foot portions 90a can be slipped beneath necked-down portions "N" in the manner shown in FIGS. 22 and 23 so that any upward forces exerted on the restraint device will cause foot portions 90a to move into engagement with necked-down portions "N" of the track in a manner to effectively restrain any upward movement of the restraint device.

Figures 11, 12, 29:
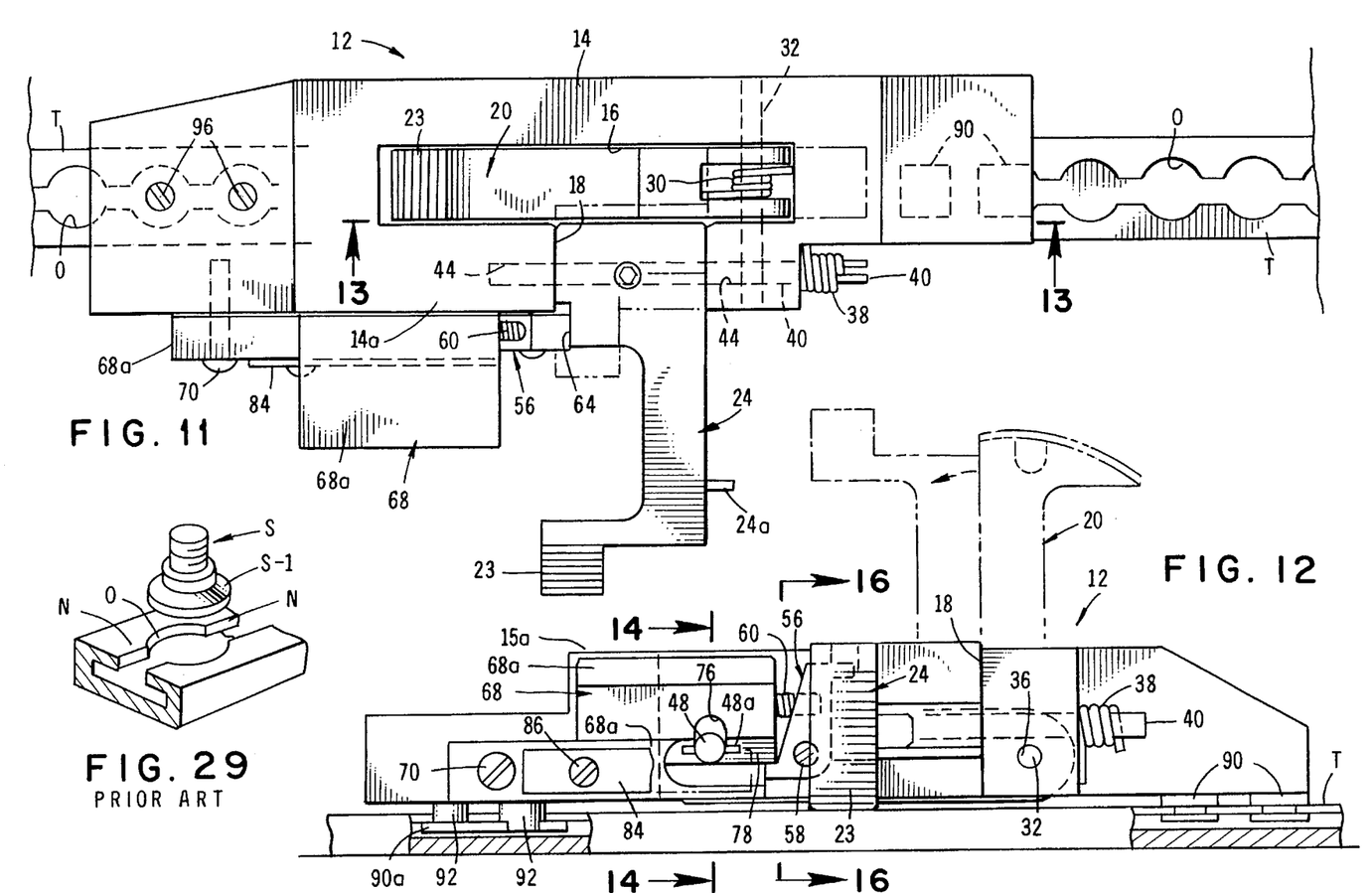
FIG. 11 is a top plan view of the apparatus in a retracted configuration.
FIG. 12 is a side-elevational, partly cross-sectional view similar to FIG. 3, but showing the carrier-restraining elements in a downward retracted position.
FIG. 29 is a fragmentary, perspective view illustrating the manner of interconnection of a typical prior art connector element of a prior art restraint device with the air craft cargo bay track.
Figure 13:
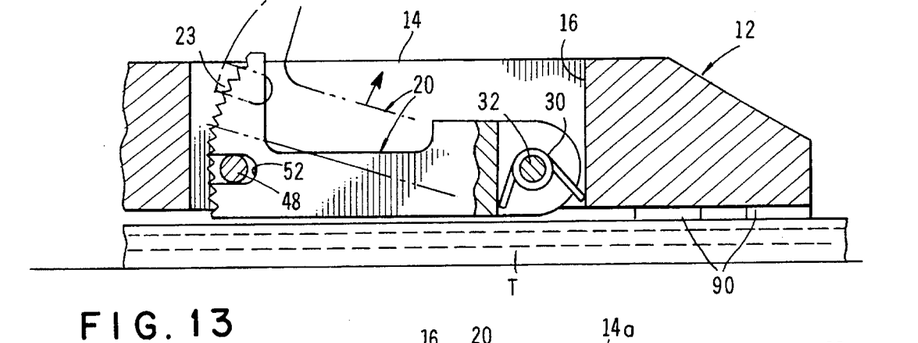
FIG. 13 is a cross-sectional view taken along lines 13—13 of FIG. 11.
Figure 20:
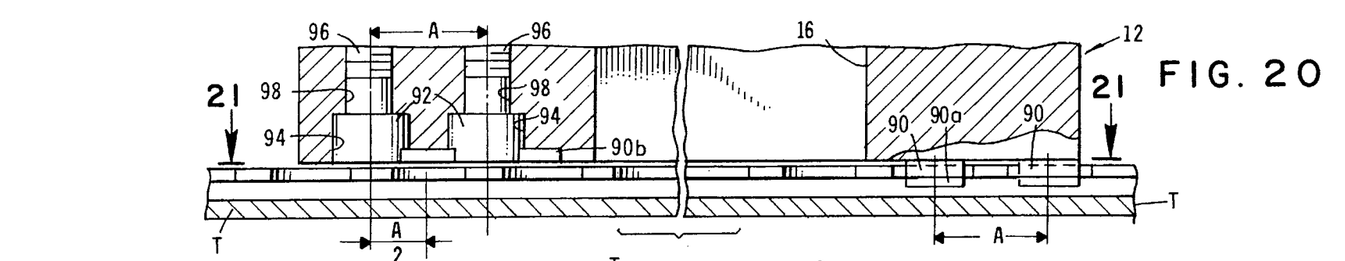
FIG. 20 is a side-elevational, cross-sectional, fragmentary view of the device showing its position after having been initially inserted into the track.
Figures 21, 22, 24:
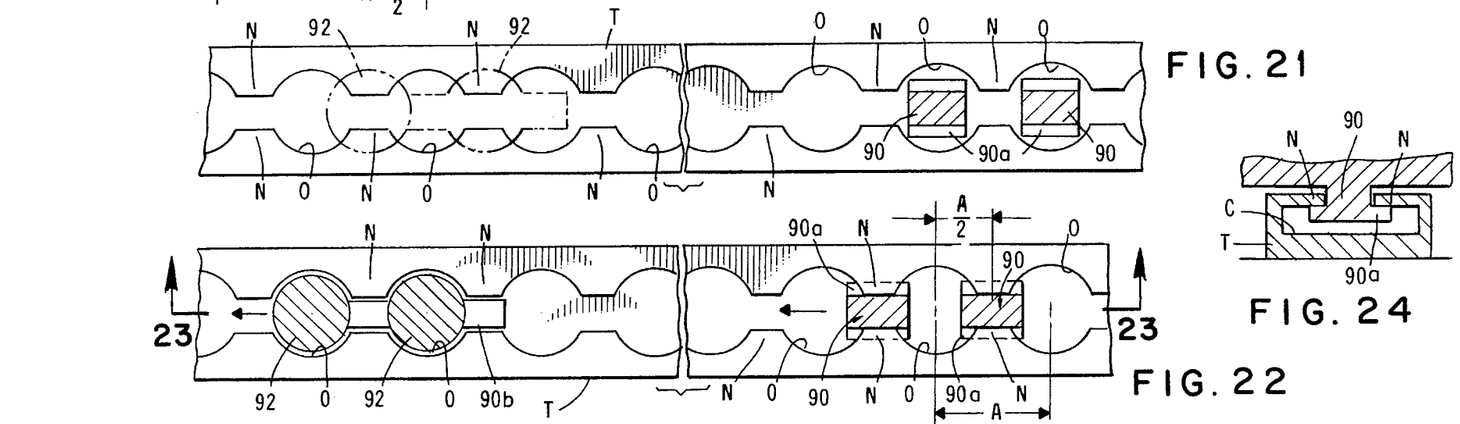
FIG. 21 is a cross-sectional view taken along lines 21—21 of FIG. 20.
FIG. 22 is a plan view similar to FIG. 21 but showing the device of the invention shifted to the left into a locking position.
FIG. 24 is a cross-sectional view taken along lines 24—24 of FIG. 23.
Figure 23:
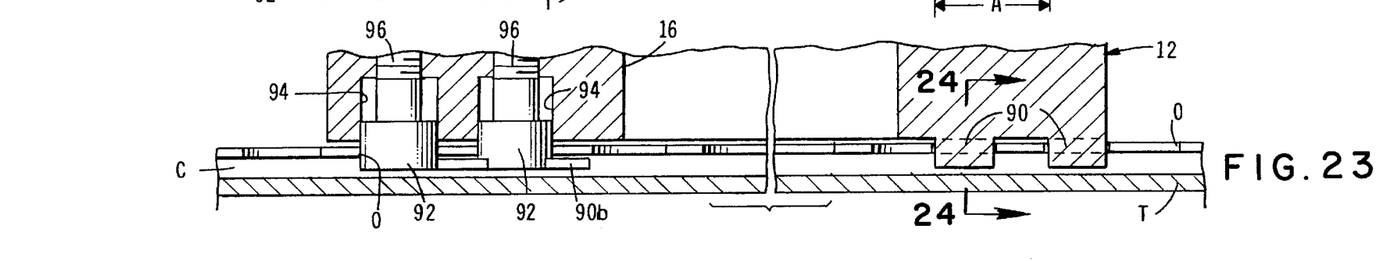
FIG. 23 is a cross-sectional view taken along lines 23—23 of FIG. 22.

Unlike the prior art locking studs which have a conically shaped upper surface "S-1" (FIG. 29) and provide only a line contact with the track lips, the stud lips of the present invention, being an extended surface (as are the track lips), provide substantially increased contact between the two surfaces which is approximately 0.3 inch in length longitudinally for each lip (see FIGS. 22, 23, and 24). This novel configuration not only reduces bending stresses on the lips but also provides a substantially greater bearing area on the lips of the track, thereby lowering the stresses imposed by the prior art studs shown in FIG. 29. As indicated in FIGS. 20 and 22, the center line spacing "A" between the locking studs 90 is such that, when the device is moved to the left as shown in FIG. 22, foot portions 90a will be centered with necked-down portions "N". In this position, as indicated in FIG. 24, a substantial area of contact is formed between the upper surface of the feet 90a and the necked-down portions "N". When the amount of surface area contact between the track and the locking studs of the present invention is compared with the very minimal line contact between the track and the circular-shaped prior art locking studs as shown in FIG. 29, it is readily apparent that substantially greater surface area is in contact with the track thereby providing a substantially greater safety factor for restraint of upward movement of the restraint device relative to the track.

Also forming an important part of the track interengagement means of the invention is track locking means for securely locking the frame of the restraint device to the tracks. In the present form of the invention, this novel track locking means comprises a pair of generally cylindrically shaped locking members 92 which are closely receivable within circular shaped cavities 94 provided in the base of frame 12. Locking members 92 are disposed intermediate a pair of specially shaped locking studs 90b of the character shown in FIG. 19 and are movable from a first retracted position, as shown in FIG. 20 where they reside within cavities 94, to a second extended position shown in FIG. 23 where they extend into aligned openings "O" provided in track "T". As indicated in FIG. 23, when the locking members 92 are received within the openings "O" in the track, sliding movement of the restraint device is effectively prevented thereby eliminating the possibility of accidental disengagement of the restraint device from the tracks "T". As shown in FIG. 20, each locking member 92 includes a threaded shank 96 which is threadably received within a threaded bore 98 provided in frame 12 (see also FIG. 2). The upper end of threaded shank 96 of each locking member is slotted so as to receive a screw driver that can be used to selectively raise and lower the locking members relative to the track "T". As indicated in FIG. 20, the distance between the center line of each locking member 92 and the center line of the necked-down portion "N" of the track "T" is one-half "A" thereby assuring that, when the locking members 92 are in their lowered position, the adjacent locking studs of the interengaging means will be disposed immediately below the necked-down portions "N" of the upper lip of the track "T". It is to be understood that various types of locking arrangements for locking restraint devices to tracks "T" are available in the industry. Several of these types of devices could be used in lieu of locking members 92.

Figure 25:
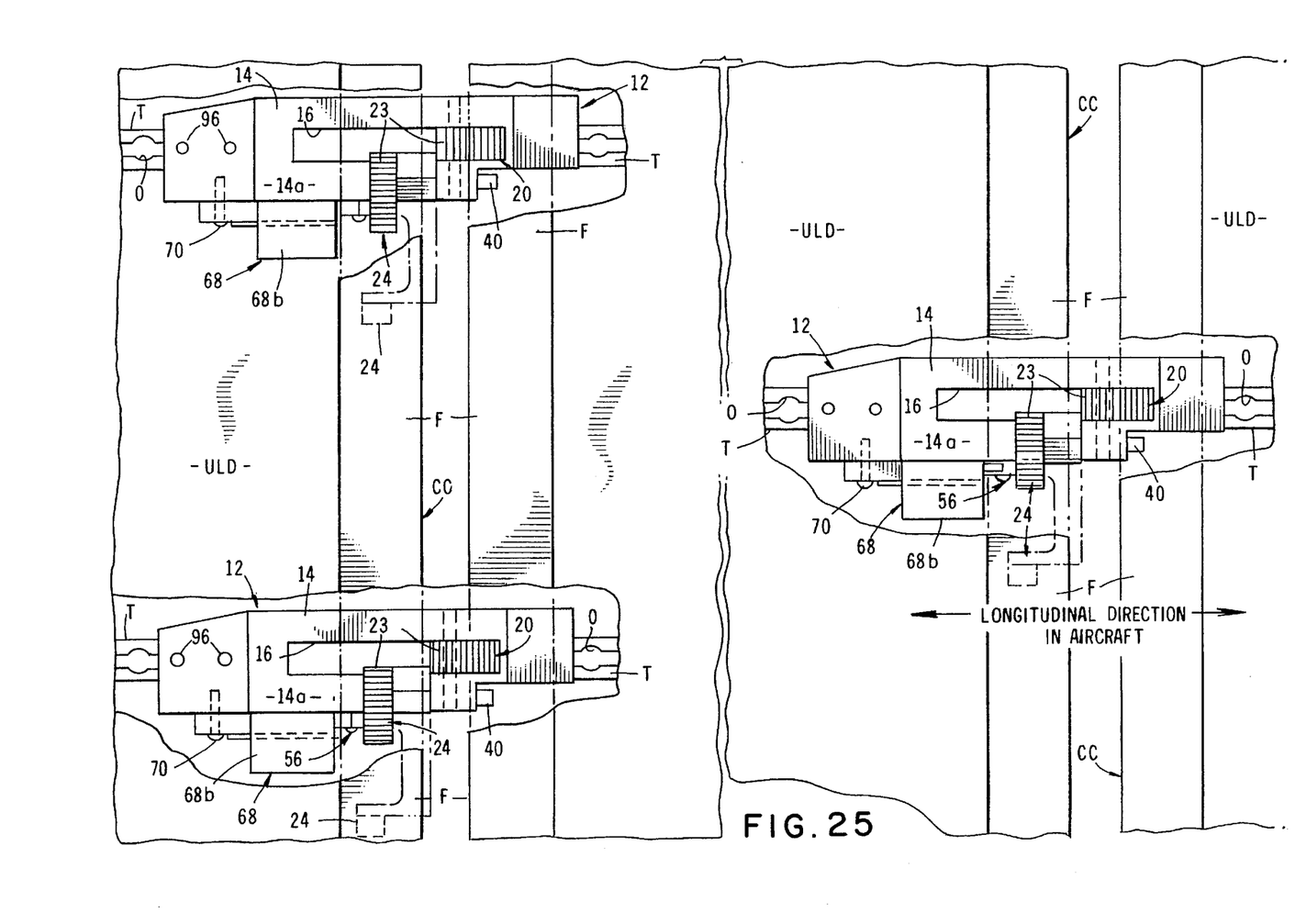
FIG. 25 is a foreshortened, plan view of a portion of the cargo bay of the aircraft showing the restraint devices disposed in a securement position relative to air cargo carriers loaded into the cargo bay.
Figure 26:
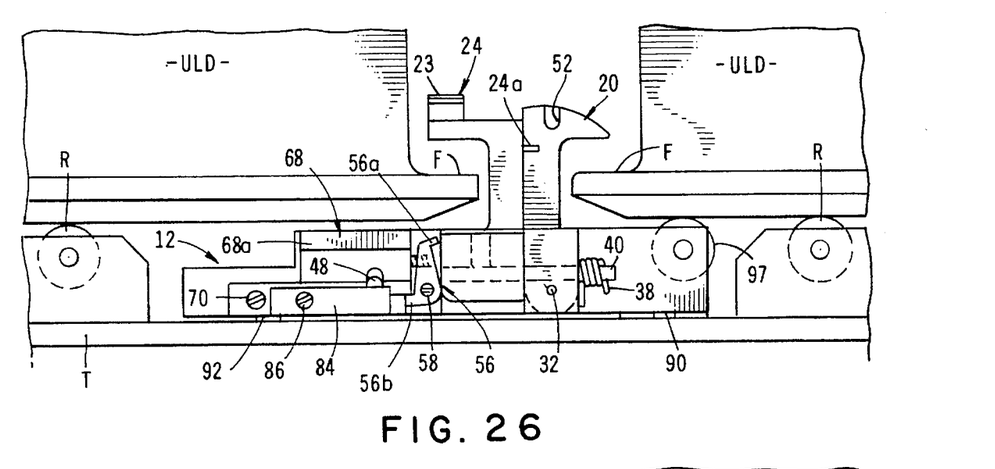
FIG. 26 is a fragmentary, side-elevational view of one of the restraint devices shown in an air cargo carrier restraining configuration.

In using the apparatus of the present invention, each restraint device is interconnected with the track "T" at a selected location in the manner described in the preceding paragraphs. With the restraint device properly oriented relative to the track, the locking members 92 are threadably moved from their retracted position into their locking position shown in FIG. 23 so as to prevent sliding movement of the restraint device within channel "C" of the track. As indicated in FIG. 25, the restraint devices are positioned within the cargo bay of the aircraft so that, when the restraint arms of the devices are in the upstanding position, the upper portions thereof will overlie edge rails or flanges "F" which are provided on the ULDs. More particularly, the restraint devices are strategically positioned along the tracks "T" so that the upper portion of restraint arm 20 will be superimposed over the edge rail "F" of one of the ULDs while the upper portion of the restraint arm 24 will be positioned over the edge rail of the next adjacent ULDs (FIG. 26). The transverse spacing of the tracks "T" within the cargo bays is such that a plurality of restraint devices can be installed along the tracks in a manner such that the restraint arms will be superimposed over the edge rails of the cargo carriers at several transversely spaced locations.

When the restraint devices are in their retracted position shown in FIGS. 25 and 26, restraint arms 20 and 24 are in their upstanding positions. When it is desired to remove the cargo carriers from the cargo bay, the restraint arms of the apparatus can be moved into their retracted or flushed position by the cargo handler engaging the upper portions of the restraint arms with his foot. For this purpose, both of the restraint arms are provided with a striated foot engaging surface 23 for non-slip engagement by the foot of the cargo handler. To move the restraint arms into their retracted position, the cargo handler first engages restraint arm 24 with his foot with sufficient downward force to overcome the urging of torsion spring 38. As the restraint arm is moved into its downward position, spring 60 will cause the upper end 56a of latching element 56 to move into locking engagement with locking slot 64 which is provided in arm 24 (see FIG. 17). With the latching member in this locking position, return of the restraint arm 24 to its upstanding position will be effectively prevented.

Figure 27:
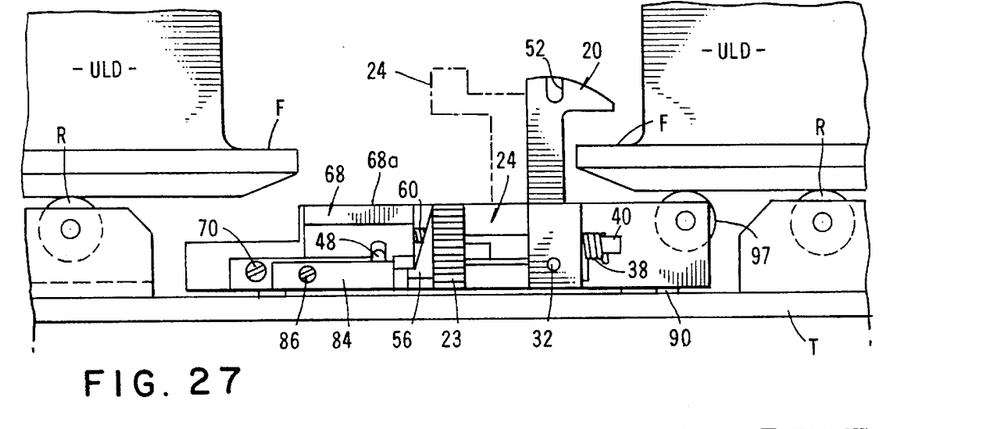
FIG. 27 is a side-elevational view similar to FIG. 26 but showing one of the carrier restraint elements moved into a retracted position.
Figure 28:
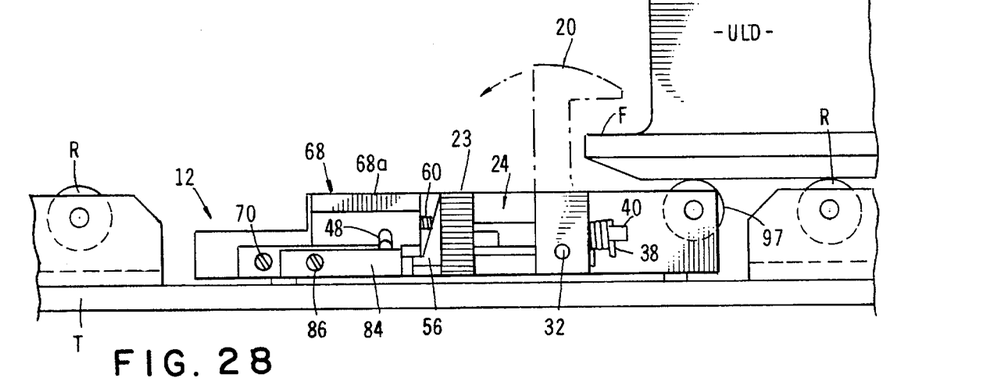
FIG. 28 is a side-elevational view similar to FIG. 27 but showing the second carrier engaging element in a downward retracted position.

With the restraint arm 24 in it retracted position as shown in FIG. 27, the cargo handler uses his foot to next move the restraint arm 20 downwardly into its retracted position within central opening 16. As restraint arm 20 moves downwardly within central opening 16, it will engage the end 50a of pin 48 which normally extends a slight distance into central opening 16 (see FIG. 14). As the restraint arm engages end 50a of pin 48, the pin will be moved to the right as viewed in FIG. 15 causing leaf spring 84 to deform slightly outwardly. This movement of spring 84 permits arm 20 to continue to move toward its fully retracted position. As arm 20 moves into its fully-retracted position, slot 52, which is formed in the upper portion of restraint arm 20, will move into alignment with pin. 48 and leaf spring 84 will urge the pin to the left, as viewed in FIG. 14, so that end 50a of the pin will be received within slot, or cavity 52 in the manner shown in FIG. 14 thereby locking arm 20 in its fully retracted position. With both of the restraining arms in the retracted position as shown in FIG. 28, the cargo container can, of course, move freely over the restraint device as it rolls along roller bearings "R" of the character typically provided in the floor of the cargo bay (see FIGS. 26 through 28). As indicated in FIG. 28, in one form of the apparatus, a roller 97 can be rollably mounted within frame 12 so that the top of the roller is in the same plane as the top of rollers "R".

When new cargo containers have been loaded into the aircraft and it is desired to restrain them in position within the cargo bay, restraint arms 20 and 24 can be quickly and easily moved into their upstanding carrier locking position by engagement of the treadle 68 with the foot. In this regard, by turning to FIGS. 14 and 15, it can be seen that a cross pin 48a extends transversely of intermediate portion 50d of pin 48 (see also FIG. 2). With the locking pin 48 in the locked position shown in FIG. 14, cross pin 48a is in engagement with the lower portion of sloping wall 78 of treadle member 68. However, upon a downward force being exerted on the treadle in the direction of the arrow of FIG. 15, pin 48a will slide upwardly relative to sloping wall 78 causing pin 48 to move to the right against the urging of leaf spring 84. At the instant that the inner end 50a of pin 48 clears slot 52 of restraint arm 20, spring 30 will rapidly cause arm 20 to pivot about axis 22 toward the upstanding position shown in FIG. 1.

Figure 8:
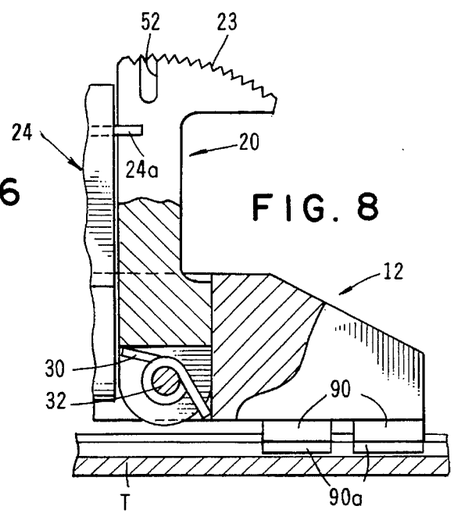
FIG. 8 is a cross-sectional view taken along lines 8—8 of FIG. 7.

It is also to be observed that, the treadle member is moved downwardly in the direction of arrow 72 shown in FIG. 18, surface 80 of treadle 68 will engage second end 56b of latch 56 causing the latch to pivot about connector 58 into the retracted position shown in FIG. 18. Upon the upper end 56a of the latch element clearing notch 64 which is provided in restraint arm 24, spring 38 will urge arm 24 to pivot about axis 26 into the upstanding position shown in FIG. 1. As indicated in FIGS. 2 and 8, a stop pin 24a, or similar stop means, which is provided on restraint arm 24 will engage the side wall of restraint arm 20 in the manner shown in FIG. 8 so as to prevent further pivotal movement of restraint arm 24 about axis 26. Torsion spring 38 will, of course, maintain arm 24 in this upstanding, locked position so that the flange of the a cargo carrier can be received beneath the upper portion of the restraint arm in the manner shown in FIGS. 26 through 28.

As best seen by referring to FIG. 26, when the restraint arms are in their upraised position, there is a clearance between the under suraces of the arms and the flange "F" of the ULD so as to accommodate warpage in the flanges of the ULDs. With this construction, during the cargo loading operation, the flanges of the ULDs can be readily positioned beneath the restraint arms in the manner shown in FIGS. 25 and 26.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A restraint device for use in restraining cargo carriers within an aircraft cargo hold, said restraint device comprising:

(a) a frame having spaced apart side walls defining a central opening, one of said side walls being interrupted to define a side opening in communication with said central opening;

(b) a first restraint element pivotally connected to said frame for pivotal movement within said central opening about a first axis between an upstanding position and a lowered portion; and (c) a second restraint element pivotally connected to said frame for pivotal movement within said side opening about a second axis between an upstanding position and a lowered position, said second axis extending generally perpendicular to said first axis.

2. A restraint device as defined in claim 1 in which each of said first and second restraint elements include carrier-restraining portions disposed proximate the air cargo containers when said elements are in said upstanding position.

3. A restraint device as defined in claim 1 further including a first biasing means for yieldably resisting movement of said first restraint element toward said lowered position; and second biasing means for yieldably resisting movement of said second restraint element toward said lowered position.

4. A restraint device as defined in claim 3 further including first locking means for releasably locking said first restraint element in said lowered position; and second locking means for releasably locking said second restraint element in said lowered position.

5. A restraint device as defined in claim 4 further including release means for releasing said first and second locking means, whereby each of said first and second restraint elements will move into said upstanding position.

6. A restraint device as defined in claim 5 in which said restraint device is operable by the foot of the cargo handler and in which each of the first and second restraint elements include a foot engaging portion for engagement by the foot of the cargo handler to move said elements into said lowered positions against the urging of said biasing means.

7. A foot operated restraint device for use in restraining adjacent air cargo carriers within an aircraft cargo hold having a floor provided with spaced apart tracks, the air cargo containers having lower, outwardly extending flange portions, said restraint device comprising:

(a) a frame having spaced apart top and bottom walls and spaced apart side walls defining a central opening, one of said side walls being interrupted to define a side opening in communication with said central opening;

(b) a first restraint element pivotally connected to said frame for pivotal movement within said central opening about a first axis between an upstanding position and a lowered portion; and (c) a first biasing means for yieldably resisting movement of said first restraint element toward said lowered position;

(d) first locking means for releasably locking said first restraint element in said lowered position;

(e) a second restraint element pivotally connected to said frame for pivotal movement within said side opening between an upstanding position and a lowered position;

(f) second biasing means for yieldably resisting movement of said second restraint element toward said lowered position;

(g) second locking means for releasably locking said second restraint element in said lowered position; and (h) release means for releasing said first and second locking means whereby each of said first and second restraint elements will move into said upstanding position.

8. A restraint device as defined in claim 7 in which said first restraint element pivots about a first axis and in which said second restraint element pivots about a second axis extending generally perpendicular to said first axis.

9. A restraint device as defined in claim 7 in which each of said first and second restraint elements is provided with a foot engaging portion engagable by the foot of the user to move said first and second restraint elements into their lowered position against the urging of said first and second biasing means respectively.

10. A restraint device as defined in claim 7 in which said frame further includes track interengagement means for connecting said frame to the tracks in the cargo bay.

11. A restraint device as defined in claim 7 in which said first locking means comprises a locking pin telescopically movable relative to one of said side walls of said frame between a first and a second position, said locking pin having a first end, a second end and an intermediate portion, said first end being in locking engagement with said first restraint element when said locking pin is in said first position.

12. A restraint device as defined in claim 11 in which said second locking means comprises a latch element pivotally connected to said frame for pivotal movement between first and second positions, said latch element having a first end engagable with said second restraint element when said latch is in said first position and a second end engagable with said release means.

13. A restraint device as defined in claim 12 in which said second locking means further comprises latch biasing means for yieldably resisting movement of said latch element toward said second position.

14. A restraint device as defined in claim 12 in which said release means comprises:

(a) a treadle member pivotally connected to said frame for pivotal movement between first and second positions, said treadle member having a body portion and a foot engaging portion connected to said body portion, said body portion having an aperture for receiving said locking pin and a latch element engaging surface for engaging said second end of said latch element; and (b) locking pin biasing means for yieldably resisting telescopic movement of said locking pin toward said second position.

15. A restraint device as defined in claim 14 in which said body portion of said actuating member includes an inclined ramp surface and in which said intermediate portion of said locking pin includes a protuberance for sliding engagement with said ramp surface upon pivotal movement of said treadle member.

16. A foot operated restraint device for use in restraining first and second air cargo carriers within an aircraft cargo hold having a floor provided with spaced apart tracks, the air cargo containers having lower, outwardly extending flange portions, said restraint device comprising:

(a) a frame having spaced apart top and bottom walls and spaced apart side walls defining a central opening, one of said side walls being interrupted to define a side opening in communication with said central opening;

(b) a first generally U-shaped restraint element pivotally connected to said frame for pivotal movement within said central opening about a first axis between an upstanding position and a lowered portion; and (c) a first biasing means for yieldably resisting movement of said first restraint element toward said lowered position;

(d) first locking means for releasably locking said first restraint element in said lowered position, said first locking means comprising a locking pin telescopically movable relative to one of said side walls of said frame between a first and second position, said locking pin having a first end, a second end and an intermediate portion, said first end being in locking engagement with said first restraint element when said locking pin is in said first position;

(e) a second generally U-shaped restraint element pivotally connected to said frame for pivotal movement within said side opening about a second axis between an upstanding position and a lowered position, said second axis extending generally perpendicular to said first axis;

(f) second biasing means for yieldably resisting movement of said second restraint element toward said lowered position;

(g) second locking means for releasably locking said second restraint element in said lowered position, said second biasing means comprising a latch element pivotally connected to said frame for pivotal movement between first and second positions, said latch element having a first end engagable with said second restraint element when said latch is in said first position and a second end engagable with said release means; and (h) release means for releasing said first and second locking means whereby each of said first and second restraint elements will move into said upstanding position said release means comprising:

(i) a treadle member pivotally connected to said frame for pivotal movement between first and second positions, said treadle member having a body portion and a foot engaging portion connected to said body portion, said body portion having an aperture for receiving said locking pin and a latch element engaging surface for engaging said second end of said latch element; and (ii) locking pin biasing means for yieldably resisting telescopic movement of said locking pin toward said second position.

17. A restraint device as defined in claim 16 in which said frame further includes integral track interengagement means for connecting said frame to the tracks in the cargo bay.

18. A restraint device as defined in claim 17 in which said track interengagement means comprises a plurality of locking studs extending from said bottom wall of said frame, each of said locking studs having a generally rectangularly shaped foot portion receivable with an opening provided in the tracks.

19. A restraint device as defined in claim 18 in which said track interengagement means further comprises track locking means for locking said frame to one of said tracks.

20. A restraint device as defined in claim 19 in which said bottom wall of said frame includes at least one cavity and in which track locking means comprises at least one locking member telescopically movable within said cavity.

* * * * *